Jan. 27, 1959
M. L. KALINOWSKI
2,871,187
DOCTOR SWEETENING PROCESS USING SULFUR
Filed March 11, 1954
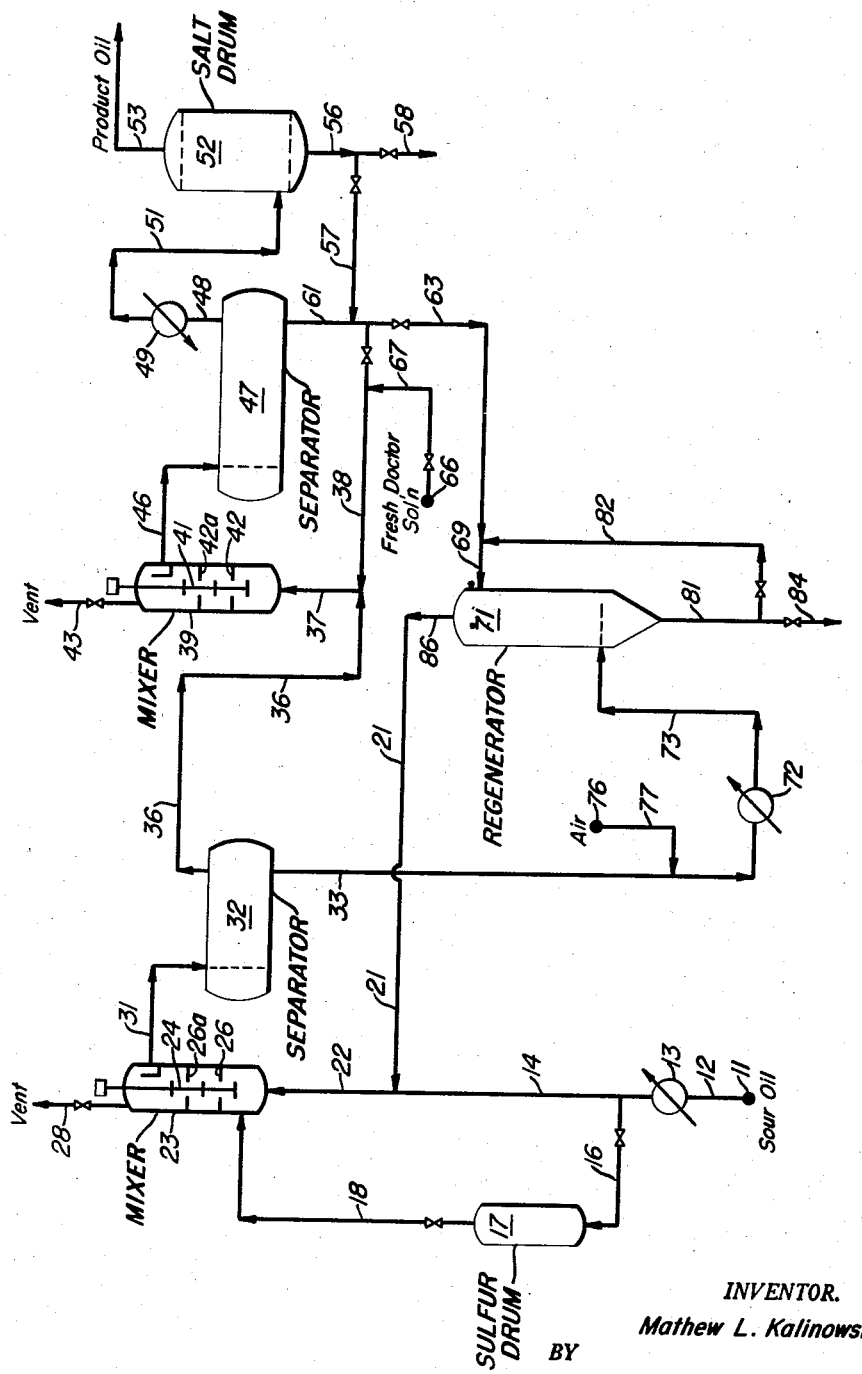
INVENTOR.
Mathew L. Kalinowski
BY
Michael Dufuney
ATTORNEY

United States Patent Office 2,871,187
Patented Jan. 27, 1959

2,871,187

DOCTOR SWEETENING PROCESS USING SULFUR

Mathew L. Kalinowski, Chicago, Ill., assignor to Standard Oil Company, Chicago, Ill., a corporation of Indiana Application March 11, 1954, Serial No. 415,520

4 Claims. (Cl. 208—199)

This invention relates to sweetening sour oil by the doctor process. More particularly it relates to an improvement in doctor sweetening wherein an oil of better color stability is produced.

The doctor process as commonly practiced involves the contacting of a sour hydrocarbon oil with an aqueous solution of alkali metal hydroxide and the corresponding plumbite in the presence of free-sulfur. It is the usual practice to dissolve free-sulfur in the sour oil prior to contacting the sour oil with the doctor solution. The doctor process is of great importance today because it is the only method which can be applied to all types of petroleum distillates and particularly to those distillates boiling in the heavier-than-gasoline range. As commonly used, the doctor process has two major disabilities, (a) occlusion of lead sulfide and doctor solution in the sweet oil and (b) poor color stability of the sweet oil.

An object of the invention is an improved doctor process. A specific object of the invention is the production of a sweet oil of good color stability by a doctor process. Still another object is a doctor process wherein the amount of lead sulfide and doctor solution entrained in the sweet oil is markedly reduced. Yet another object is a doctor process wherein the time of the sweetening reaction is decreased. Other objects will become apparent in the course of the detailed description.

The sweetening reaction time is decreased, the amount of spent doctor solution entrained is reduced and the color stability of the sweet oil is greatly improved over the conventional doctor processing in the process of this invention, which process comprises contacting the mercaptan containing hydrocarbon oil—sour—with doctor solution prior to the addition of free-sulfur. The sour oil and doctor solution are intimately contacted for a time only long enough to permit the reaction of substantially all the mercaptans with the plumbite to form lead mercaptides. At the end of this time, at least enough free-sulfur is added to react with the mercaptides and to produce an essentially sweet oil. The essentially sweet oil is then separated from the doctor solution phase. The time of contacting of the sour oil and the doctor solution, prior to the addition of free-sulfur, is dependent on the temperature of contacting; the higher the temperature of contacting, the shorter the time of contacting prior to the addition of free-sulfur. Over the range of temperatures utilized in conventional doctor processing, i. e., between about 60° and about 175° F., the time of contacting of the sour oil and the doctor solution is between about 10 seconds and about 10 minutes, the shorter times corresponding to the higher temperatures.

The hydrocarbon oil feed to the process of this invention may be any liquid hydrocarbon oil containing detectable amounts of mercaptans, which is amenable to doctor sweetening, i. e., an oil that is sour to the conventional doctor test or has a mercaptan number or copper number above about 1. The process is particularly suitable for the treatment of sour petroleum distillates boiling below about 750° F. Examples of these distillates are naphtha, kerosene, diesel oil, heater oil, gas oil, etc. The process may be used on distillates obtained by the fractional distillation of crude petroleum or on distillates obtained from various conversion processes such as thermal cracking, catalytic cracking, reforming in the presence of hydrogen, etc. Sour petroleum distillates boiling in the heavier-than-gasoline range, i. e., between about 325° and 650° F., e. g., a heater oil boiling between about 330° and 575° F., are a preferred feed.

The sweetening agent of this invention consists of a conventional doctor solution. The doctor solution is made up of an aqueous solution of an alkali metal hydroxide and the reaction product of litharge and the alkali metal hydroxide. The amount of free-alkali metal hydroxide present in the doctor solution may be between about 5 and 30 weight percent, usually between about 10 and 15%. The plumbite content is commonly given in terms of the percent of PbO theoretically present. This content for a fresh doctor solution is usually between about 1.5 and 2.5 grams of PbO per 100 cc. of solution. However, it is to be understood that the process is operative with any range of doctor solution compositions that are operable in a conventional doctor process.

The theoretical quantity of free-sulfur needed for the sweetening reaction is 0.5 mol per each mol of mercaptan sulfur present in the sour oil. For some unknown reason the use of the theoretical quantity of free-sulfur does not always produce an oil that is sweet to the doctor test.

Frequently, in order to obtain a sweet product, it is necessary to use more free-sulfur than the theoretical. The amount of excess sulfur needed is dependent upon the type of oil, and, somewhat, on the operating conditions. In general the higher boiling the sour oil, the more excess sulfur that is needed to produce a sweet product. In general, the usage of free-sulfur is between about 100% and about 250% of the amount theoretically required to convert the mercaptans to disulfides. The process is carried out with the minimum amount of free-sulfur consistent with sweetening requirements and operating conditions; usually a better break of the sweet oil and the doctor solution phase is obtained when more sulfur is used than is needed to sweeten the oil. In the case of petroleum distillates boiling in the heavier-than-gasoline range, it is preferred to operate with between about 105% and about 175% of the theoretical requirement of free-sulfur.

In addition to the use of free-sulfur, free-oxygen may be introduced into the sweetening zone. The presence of free-oxygen has a favorable effect on the usage of free-sulfur and also helps to convert some of the PbS formed in the sweetening reaction to the soluble plumbite formed. In general, the amount of free-oxygen added is between about 100 and 300% of that theoretically needed to convert the PbS.

In the process of this invention, a sour oil and doctor solution are brought together and contacted for a time prior to the addition of free-sulfur to the mixture of sour oil and doctor solution. Although favorable results are obtained by operating for lesser times, the best results are obtained by continuing the contacting of the sour oil and the doctor solution until substantially all of the mercaptans have been converted to lead mercaptides. At this point, free-sulfur is added to the system. In order to complete the sweetening reaction, the contacting of the oil-doctor solution-sulfur is continued until the oil is essentially sweet, i. e., shows a very slight amount of mercaptan present to the doctor test or a mercaptan number of less than 1 (mg. of mercaptan sulfur per 100 ml. of oil). The preferred time for free-sulfur addition may be observed visually, and occurs just before the oil phase changes in color from lemon yellow to muddy brown. Apparently the lead mercaptides decompose to produce products which not only color the oil, but also promote emulsion formations which result in excessive entrainment of doctor solution and lead sulfide in the oil.

The time of contacting of the sour oil and doctor solution prior to addition of the free-sulfur varies with the temperature of contacting; the higher the temperature of contacting, the shorter the time of contacting prior to the addition of free-sulfur. To illustrate: At a temperature of 150° F. the maximum contacting time prior to sulfur addition is about 30 seconds; at 120° F. the time is about 2 minutes; and at 100° F. the time is about 5 minutes. Over the range of temperatures used in doctor sweetening, i. e., between about 60° F. and 175° F. the maximum desirable contacting time prior to free-sulfur addition is between about 10 seconds and about 10 minutes, the higher temperatures corresponding to the shorter times.

The oil-doctor solution-sulfur are contacted for a time sufficient to complete the sweetening reaction. This time varies with not only the temperature of contacting, but also the amount of free-sulfur usage. The determination of this time is within the ordinary skill of the art and may readily be determined by the conventional doctor test.

The process of the invention is described in more detail in connection with the annexed drawing which forms a part of this specification. It is to be understood that many items of process equipment have been omitted from this drawing in order to simplify the presentation; these items may be readily added by one skilled in the art.

In the drawing, the sour oil from source 11 is passed through line 12 and heat exchanger 13. The sour oil is a high sulfur content heater oil boiling between 330° and 570° F. and with a mercaptan number of 70. In heat exchanger 13, the sour oil is raised to a temperature of about 100° F. The warm oil is passed from heat exchanger 13 into line 14.

A slip stream of sour oil is withdrawn from line 14 and is passed by way of valved line 16 into sulfur drum 17. Sulfur drum 17 is filled with crushed roll sulfur. The oil dissolves a sufficient amount of the sulfur to introduce into the sweetening zone 160% of the amount of free-sulfur theoretically required to sweeten the sour oil. The free-sulfur containing oil is passed from sulfur drum 17 by way of valved line 18.

Doctor solution from line 21 is introduced into line 14. This doctor solution is at a temperature of about 240° F. since this stream comes directly from the regeneration zone. Herein 12 volume percent of doctor solution, based on sour oil charged, is introduced into line 14. This doctor solution contains free-oxygen which is derived from the air introduced into the regeneration zone. Herein the doctor solution contains about 200% of the free-oxygen theoretically required to convert the mercaptans in the sour oil to disulfides.

The combined stream of sour oil from line 14 and doctor solution-air from line 21 is passed by way of line 22 into mixer 23. Mixer 23 is provided with motor driven stirrer 24. In order to improve agitation in the vessel, mixer 23 is provided with baffle plates 26 and 26a.

The stream of sour oil and doctor solution is introduced into mixer 23 at a point lower than the point of entry of free-sulfur. By this technique, the sour oil and doctor solution are contacted, in the absence of free-sulfur, for a time of about 45 seconds. The free-sulfur containing oil is introduced by way of line 18 into mixer 23 at a point above the point of sour oil-doctor solution entry and below the first baffle 26. The stirrer brings the two streams together at about the time that substantially all the mercaptans in the sour oil have been converted to lead mercaptides and prior to appreciable decomposition of the lead mercaptides to harmful by-products. The sour oil-doctor solution-sulfur are contacted in mixer 23 for a time sufficient to complete the sweetening reaction which is about 3 minutes at the temperature in mixer 23 of 145° F.

Mixer 23 is provided with a vent 28 which permits removal of gas from the system. The sweet oil-doctor solution mixture is withdrawn at a trap-out point and is passed by way of line 31 into separator 32. Separator 32 is an essentially horizontal cylindrical vessel wherein a separation of the sweet oil and the doctor solution takes place. The lower doctor solution phase is withdrawn from separator 32 by way of line 33.

The sweet oil phase which contains some entrained doctor solution and lead sulfide is withdrawn at an upper point of separator 32 and is passed by way of line 36 into line 37. Doctor solution from line 38 is passed into line 37. The combined stream of oil and doctor solution is passed into mixer 39 which is similar in construction to mixer 23. Mixer 39 is provided with a motor driven stirrer 41 and a vent 43.

In mixer 39, oil from line 36 and the doctor solution from line 38 are contacted for about 5 minutes at a temperature of about 145° F. Twelve volume percent of doctor solution are used herein based on oil from line 36.

The primary purpose of this operation in mixer 39 is to remove entrained lead sulfide from the oil. The oil-doctor solution mixture is withdrawn from mixer 39 by way of line 46 and is passed into separator 47 which is similar in construction to separator 32. The upper sweet oil phase is withdrawn from separator 47 by way of line 48 and heat exchanger 49. In heat exchanger 49, the temperature of the oil is reduced to about 75° F. The cooled oil is passed from heat exchanger 49 by way of line 51 into salt drum 52. Salt drum 52 is a vertical cylindrical vessel provided with a bed of crushed rock salt. The rock salt removes entrained lead sulfide and doctor solution and completes the clarification of the sweet oil. Other means of removing entrained material may be used such as a sand filter, a rock filter or by water washing. The product oil is withdrawn from salt drum 52 by way of line 53 and is passed to storage not shown.

The aqueous materials from salt drum 52 is withdrawn by way of line 56 and may be recycled by way of valved line 57 or sent to waste disposal by way of valved line 58. The lower doctor solution phase in separator 47 is withdrawn by way of line 61 where it may meet recycled aqueous material from valved line 57. Normally, the contents of line 61 are passed by way of valved line 38 into line 37 for reuse in mixer 39. Occasionally all of the doctor solution may be withdrawn from the system by way of valved line 63 for regeneration. The necessary amount of makeup is introduced from fresh doctor solution storage 66 by way of valved line 67 into valved line 38.

Spent doctor solution from line 63 is passed by way of line 69 into regenerator 71. Herein regenerator 71 is a vertical cylindrical vessel provided with a cone bottom. Doctor solution from separator 32 is passed by way of line 33, heat exchanger 72 and line 73 into a lower point of regenerator 71. Air from source 76 is passed by way of line 77 into line 33. Sufficient air is introduced into line 33 not only to provide the free-oxygen necessary to convert lead sulfide to soluble plumbite, but also provide free-oxygen for use in mixer 23.

Regenerator 71 is maintained at a temperature of about 240° F. The contents of the regenerator are continuously circulated by way of line 81, valved line 82 and line 69. Completely spent solution which cannot be effectively regenerated is sent to waste disposal by way of valved line 84. Regenerated doctor solution is withdrawn from an upper part of regenerator 71 and is passed by way of line 86 and line 21 into line 22 for use in mixer 23.

It is to be understood that the above embodiment is only one method of carrying out the process of this invention. While the two-stage doctor contacting technique is utilized in the above embodiment for the sweetening of this refractory heater oil, it is possible to obtain oils of satisfactory quality by using only one stage of doctor contacting. This is particularly so when the feed is a naphtha or a light kerosene.

The benefits obtainable by the use of the process of this invention are pointed out in the following tests. It is to be understood that these tests are merely illustrative of the results obtainable with particular feeds and do not in any way limit the scope of the invention.

TEST A

The equipment and procedure utilized in the test are as follows: The reactor consisted of a three-necked glass flask having a capacity of 1 liter; creases in the sides of the flask improved the contacting efficiency. The flask was provided with a motor driven propeller stirrer, a thermometer, means for injecting air and an electrically heated jacket. In each run, 500 cc. of sour oil was charged. In each run the doctor solution contained 11 weight percent of sodium hydroxide and 1.8 grams of litharge per 100 cc. of doctor solution. The free-sulfur was added as a one weight percent solution in xylene.

The runs in this test were carried out, except for Run 1, by adding the sour oil to the flask and then adding 10 volume percent, based on oil, of doctor solution, simultaneously starting the stirrer. The stirring was continued for a predetermined time; at the end of this contacting time the desired amount of free-sulfur was added to the contents of the flask and the stirring continued until the oil was sweet to the doctor test. At the end of this time, the stirring was stopped and the contents of the flask allowed to settle into an upper oil phase and a lower doctor solution phase. For uniformity, the settling time was 30 minutes in each run. As a measure of the amount of entrainment of lead sulfide and doctor solution in the sweet oil phase, the optical density of this phase was measured. The measurement was carried out using an electrophotometer equipped with a "B" 425 Angstrom filter made by the Fisher Scientific Company, Pittsburgh, Pennsylvania. The optical density scale utilized throughout these tests utilized pure distilled water as the standard. An optical density of "zero" is equal to the transparency of pure distilled water. An optical density of "100" represents 10% of the transparency of pure distilled water.

The sweet oil phase was water washed to remove entrained lead sulfide and doctor solution and then freed of water by passage through a filter paper coalescer. The color of the product oil was measured on the Saybolt scale immediately after coalescing; this color is designated hereinafter as the initial color of the product oil. The color stability of the oil in storage was determined by means of an accelerated test. This accelerated test predicts with good accuracy the behavior of an oil on storage at 90° F. in a tank vented to the atmosphere. The accelerated test consists of maintaining 100 cc. of oil in an open beaker at a temperature of 200° F. for 20 hours. Hereinafter the color of the oil after this accelerated test is designated as the "aged" color.

For comparative purposes, a run was carried out wherein the free-sulfur was added to the sour oil in the flask immediately prior to the addition of the doctor solution. This test closely approximates the usual mode of carrying out the doctor process.

The oil in this test was a heater oil having a mercaptan number of 15. An ASTM boiling range: Initial—338° F.; 10%—370° F.; 50%—432° F.; 90%—511° F.; and maximum—562° F. All the runs were carried out using 10 volume percent of doctor solution, 150% of theory of free-sulfur and a contacting temperature of 105° F. The results of these runs are set out in Table I.

The color of the oil phase provides an unmistakable clue to the maximum time of contacting prior to the addition of free-sulfur. It is believed that the decomposition of the lead mercaptides results in the formation of color bodies which not only give the oil phase a brown muddy color, but persist in the oil even after sweetening. The data above show an abrupt inversion at about the time that the oil phase color changed from a bright lemon yellow to brown. Thus, Run 5 shows that the oil phase contained considerably more entrained material and that the color stability as measured by the accelerated test decreased to a point where it was no better than regularly doctor sweetened oil—Run 1.

*Table I*

| Run No. | Contacting time prior to adding free-sulfur, seconds | Color of oil phase immediately before adding sulfur | Total time to obtain sweet oil, minutes | Optical density, sweet oil phase | Color, Saybolt, product oil | |
|---|---|---|---|---|---|---|
| | | | | | Initial | Aged |
| 1 | (¹) | | 25 | >100 | 20 | 11 |
| 2 | 15 | Pale yellow | 10 | 100 | 18 | 13 |
| 3 | 30 | Yellow | 7 | 92 | 25 | 21 |
| 4 | 60 | Lemon yellow | 4 | 65 | 24 | 21 |
| 5 | 300 | Brown (muddy) | 4 | >100 | 21 | 11 |

¹ Added before doctor solution.

These data show that it is possible to reduce the total sweetening time by 80% when the free-sulfur is added after the sour oil and doctor solution are intermingled. Also, these data show that the amount of entrainment in the sweet oil phase is quite sharply decreased by adding the free-sulfur after the sour oil and doctor solution are intermingled. In view of the fact that the initial color of the product oil is only slightly improved by adding the free-sulfur after the sour oil and doctor solution have been intermingled, the improvement in color stability is remarkable indeed. The data show that the aged color improved from 11 to 20 Saybolt.

TEST B

This test was carried out to observe the effect of the process of this invention on the sweetening of a heavy naphtha. The sour oil charged to this test had the following characteristics:

API gravity _____ 46°
RVP _____ 0.5
Mercaptan number _____ 22
Sulfur, weight percent _____ 0.1
ASTM, ° F.:
  Initial _____ 330
  10% _____ 343
  50% _____ 370
  90% _____ 428
  Max. _____ 460

The mode of operation followed that of Test A except that only 5 volume percent of doctor solution was used and the temperature of contacting was 110° F. In both runs, 150% of the theoretical requirement of free-sulfur was added. Run No. 6 was carried out adding the free-sulfur to the oil before adding the doctor solution. Run No. 6a was carried out adding free-sulfur 60 seconds after the initial intermingling of the sour oil and the doctor solution. (All Saybolt colors are "plus" except where indicated as "minus.") The results of this test are set out in Table II.

*Table II*

| Run No. | Sulfur added before-after doctor solution | Total time to obtain sweet oil, minutes | Optical density, sweet oil phase | Color Saybolt product oil | |
|---|---|---|---|---|---|
| | | | | Initial | Aged |
| 6 | Before | 20 | 57 | 6 | −3 |
| 6a | After ¹ | 10 | 18 | 14 | 9 |

¹ 60 seconds.

These results show that the total sweetening time was cut in half by adding the free-sulfur after the sour oil and doctor solution are intermingled. The optical densities show that a very considerable reduction in the amount of entrainment is obtained by adding the free-sulfur after the sour oil and doctor solution have been intermingled. The presence of cracked components in the heavy naphtha feed is shown by the relatively low colors of the product oil. However, Run 6a shows the vast improvement in color stability obtained by adding the free-sulfur after the sour oil and doctor solution have been intermingled.

TEST C

This test was carried out to determine the effect of (1) variation in percent free-sulfur addition and (2) the effect of two stages of doctor solution contacting. The operation was carried out in the first stage in the same manner as described in Test A above. The oil phase from the first stage was contacted with fresh doctor solution for 5 minutes in a second stage. After the 5 minute contacting, the contents of the flask were settled for 30 minutes and the two phases separated. The oil from the second stage was then treated to remove entrained material as described in Test A. This oil is the product oil of Runs 7–9.

In this test the sour oil charged was that oil described in Test A. The contacting in each stage was carried out at 150° F. and 10 volume percent of doctor solution, based on oil, were used in each stage of contacting. In this test where the free-sulfur was added after the sour oil and doctor solution had been intermingled, the time between the initial contacting between the sour oil and doctor solution and the addition of the free-sulfur was 30 seconds. The results of these runs are set out in Table III.

*Table III*

| Run No. | Free-sulfur usage, percent of theory | Sulfur added before-after doctor solution | Total time to obtain sweet oil, minutes | Optical density, oil phase | | Color Saybolt product oil | |
|---|---|---|---|---|---|---|---|
| | | | | 1st stage | 2d stage | Initial | Aged |
| 7 | 200 | Before | 2 | 22 | 15 | 27 | 21 |
| 7a | 200 | After [1] | 1 | 19 | 7 | 28 | 24 |
| 8 | 150 | Before | 65 | 63 | 21 | 13 | 9 |
| 8a | 150 | After [1] | 2.5 | 57 | 3 | 28 | 24 |
| 9 | 125 | Before | 95 | 78 | 14 | 21 | 12 |
| 9a | 125 | After [1] | 5 | 63 | 11 | 28 | 24 |

[1] 30 seconds.

These data show an astonishing reduction in sweetening time when the sulfur is added after the sour oil and doctor solution have been intermingled for a period of time. This reduction in time is particularly important when operating with relatively small amounts of free-sulfur. This beneficial effect would be of great economic importance even if it were the only benefit derivable from the process of this invention.

The data show that the delayed addition of free-sulfur has a definite beneficial effect on the amount of entrainment in the oil phase from the first stage; the improvement in clarity of the oil phase is even more marked after the second stage of contacting. The improvement in clarity is particularly noticeable when operating with the higher amounts of free-sulfur.

These data show that a remarkable improvement in color stability of the oil from the process of this invention is apparent over the entire range of free-sulfur usage. The greatest improvement in color stability occurs with relatively low sulfur usage.

The results of the above tests clearly show that the process of this invention produces product oils of vastly improved color stability with far less free-sulfur usage in a much shorter time than does the usual type of doctor sweetening. Not only does the reduction in sulfur usage result in an economic advantage to this process, but the decrease in sweetening time and the improved clarity of the oil phase results in an increase in capacity of a doctor sweetening plant. This, because sweetening time and settling time are the bottlenecks in ordinary doctor sweetening.

Thus having described the invention what is claimed is:

1. A doctor sweetening process which comprises (1) intimately contacting a sour hydrocarbon oil and doctor solution in an amount between about 4 and about 15 volume percent based on said oil, said contacting being carried out at a temperature between about 100° F. and about 150° F. between on the order of 30 seconds and on the order of 1 minute wherein the contacting time is related to the contacting temperature with the shorter time corresponding to the higher temperature (2) at the end of said contacting time of step 1 continuing said contacting while adding to the mixture of said oil and said solution from step 1 free sulfur in an amount between about 105 percent and about 175 percent of the amount theoretically required to convert the mercaptans present in said sour oil to disulfides and continuing the contacting of oil, doctor solution and free sulfur until said oil has become essentially sweet and (3) separating essentially sweet oil from doctor solution.

2. The process of claim 1 wherein said sour oil is a naphtha.

3. The process of claim 1 wherein said sour oil is a petroleum distillate boiling in the heavier than gasoline range.

4. The process of claim 3 wherein said distillate is a heater oil.

References Cited in the file of this patent
UNITED STATES PATENTS

| | | |
|---|---|---|
| 378,246 | Frasch | Feb. 21, 1888 |
| 1,962,181 | Egloff | June 12, 1934 |
| 2,056,618 | Overbaugh | Oct. 6, 1936 |
| 2,336,109 | Lowry et al. | Dec. 7, 1943 |
| 2,344,910 | Windle | Mar. 21, 1944 |
| 2,356,704 | Shmidl et al. | Aug. 22, 1944 |
| 2,739,926 | Kalinowski et al. | Mar. 27, 1956 |